United States Patent
Robinson

(10) Patent No.: US 11,819,011 B1
(45) Date of Patent: Nov. 21, 2023

(54) FISHING APPARATUS

(71) Applicant: Marion Johnathan Robinson, Tremont, MS (US)

(72) Inventor: Marion Johnathan Robinson, Tremont, MS (US)

(*) Notice: Subject to any disclaimer, the term of this patent is extended or adjusted under 35 U.S.C. 154(b) by 0 days.

(21) Appl. No.: 17/019,193

(22) Filed: Sep. 11, 2020

Related U.S. Application Data

(60) Provisional application No. 62/898,662, filed on Sep. 11, 2019.

(51) Int. Cl.
*A01K 83/02* (2006.01)

(52) U.S. Cl.
CPC ..................... *A01K 83/02* (2013.01)

(58) Field of Classification Search
CPC ................ A01K 83/00; A01K 83/02
USPC ........................... 43/34, 35, 36, 37
See application file for complete search history.

(56) References Cited

U.S. PATENT DOCUMENTS

| | | | |
|---|---|---|---|
| 2,118,147 A * | 5/1937 | Blodgett | ............... A01K 97/14 |
| 2,215,613 A | 9/1940 | Hathaway | |
| 5,363,588 A * | 11/1994 | Konow | ................... A01K 85/00 |
| | | | 43/43.16 |
| 7,370,450 B2 | 5/2008 | Roos | |
| 7,698,852 B1 * | 4/2010 | Cox | ........................ A01K 83/02 |
| | | | 43/37 |
| 2002/0124456 A1 * | 9/2002 | Mendoza | ............... A01K 83/06 |
| | | | 43/44.82 |
| 2014/0283433 A1 * | 9/2014 | Gafford | .................. A01K 83/02 |
| | | | 43/36 |
| 2016/0143258 A1 | 5/2016 | Brandt | |
| 2016/0205906 A1 | 7/2016 | White et al. | |

* cited by examiner

*Primary Examiner* — Joshua E Rodden
*Assistant Examiner* — Henry Hooper Mudd
(74) *Attorney, Agent, or Firm* — Walker, McKenzie & Walker, P.C.

(57) ABSTRACT

A fishing apparatus including a shank, a hook extending from the shank, one or more extendable barbs, and a spring. Each extendable barb has first and second ends and is disposed for angular movement with respect to the hook from the first end, from a first barb position in which the barb second end is proximate the hook to a second barb position in which the second end of the barb extends outwardly from the hook. The spring forcibly urges each extendable barb from first to second barb positions. A band may be included, circumferentially encircling the hook, slidably movable from first to second band positions. When in the first band position, each barb is held in a slot by the band. When in the second band position, each barb is urged by the spring into its second barb position. Fixed barbs may also be included.

8 Claims, 6 Drawing Sheets

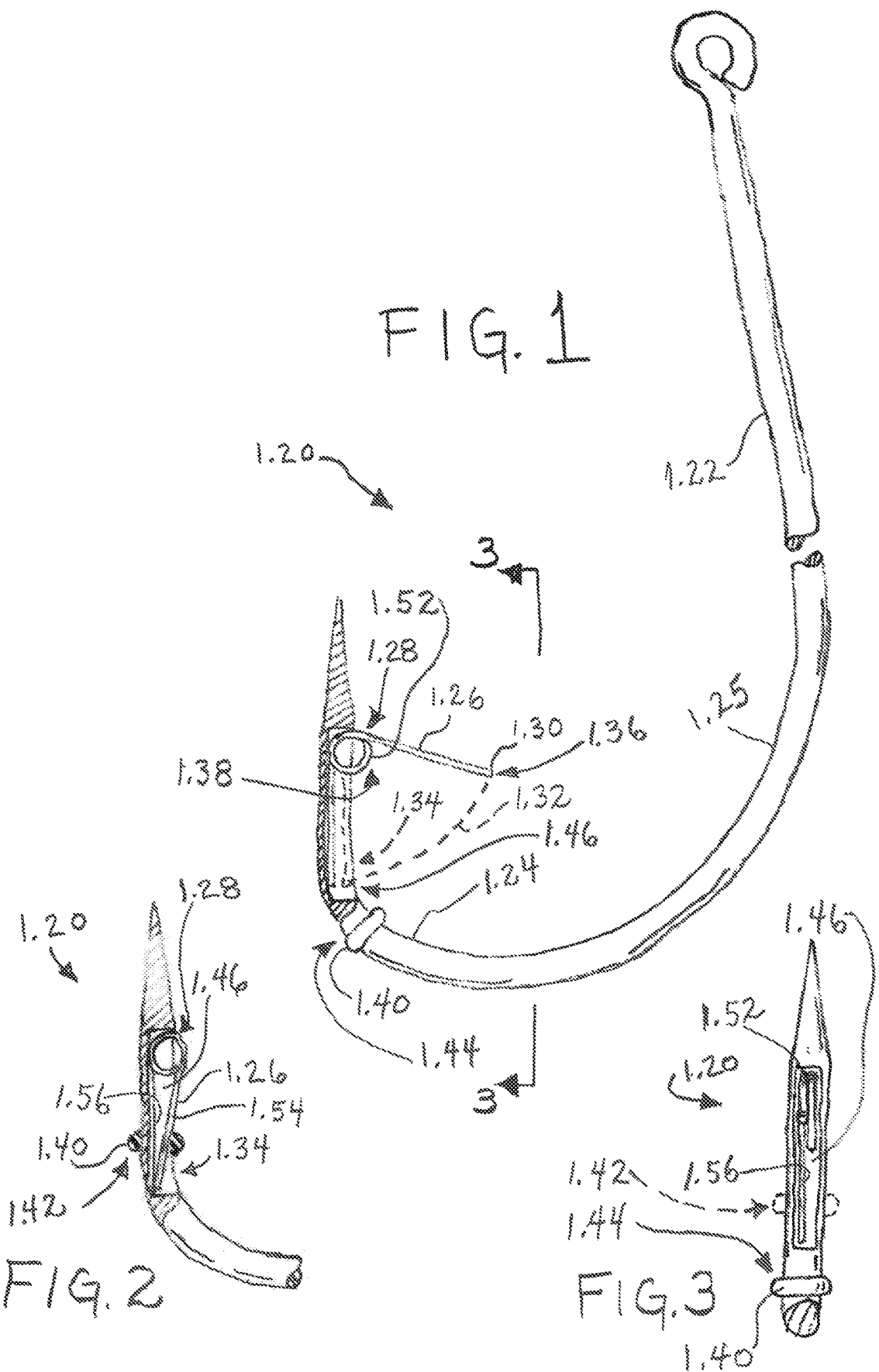

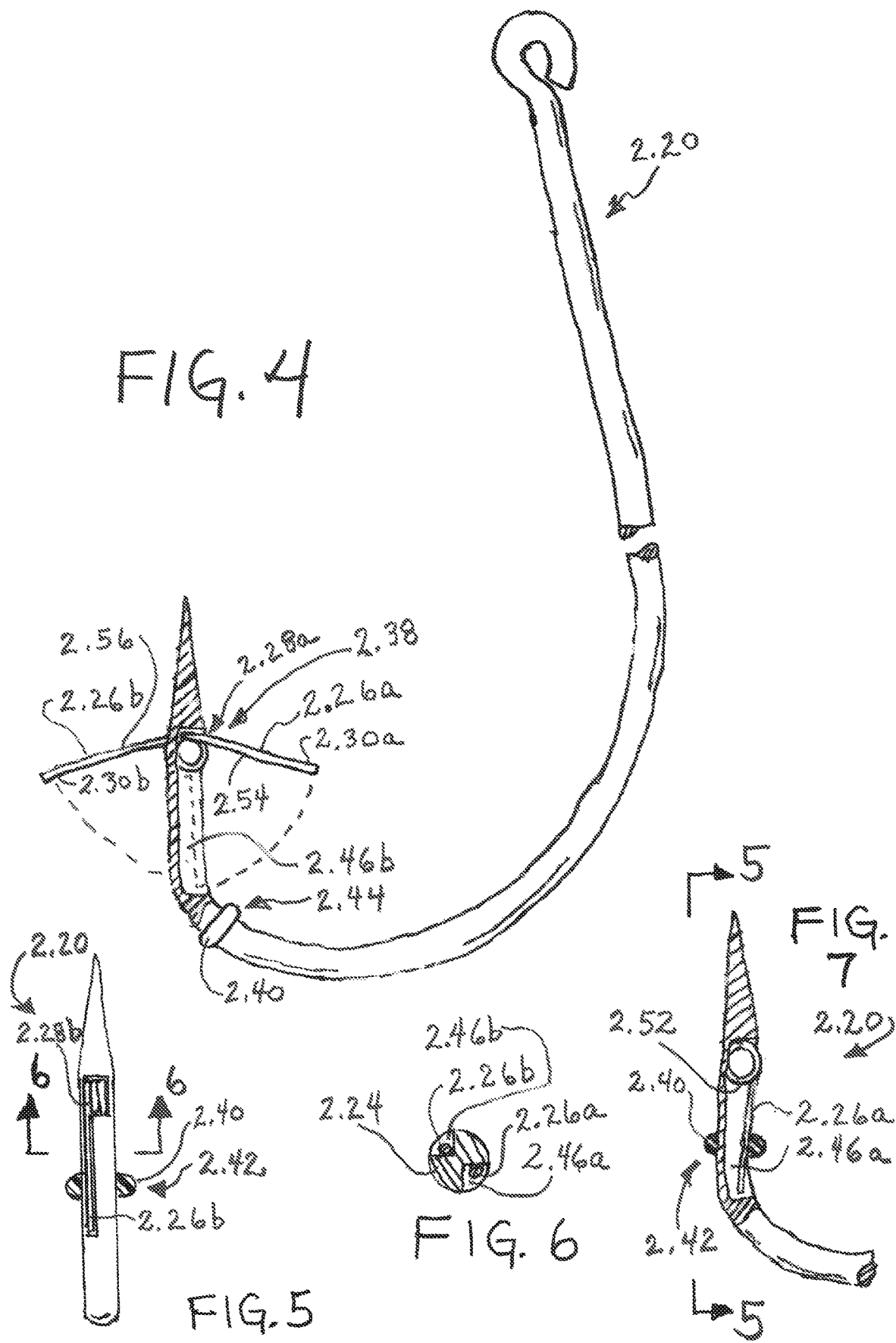

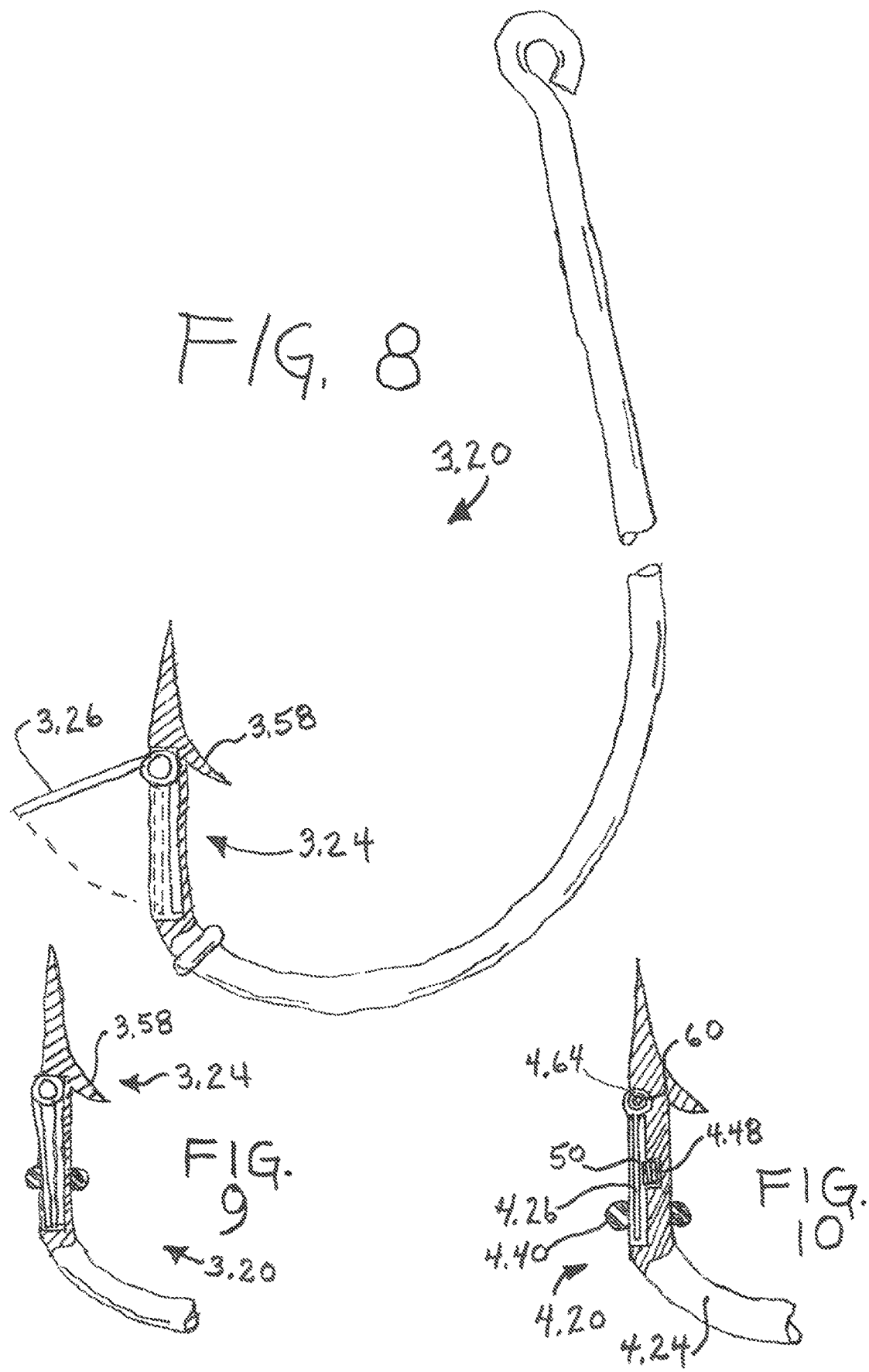

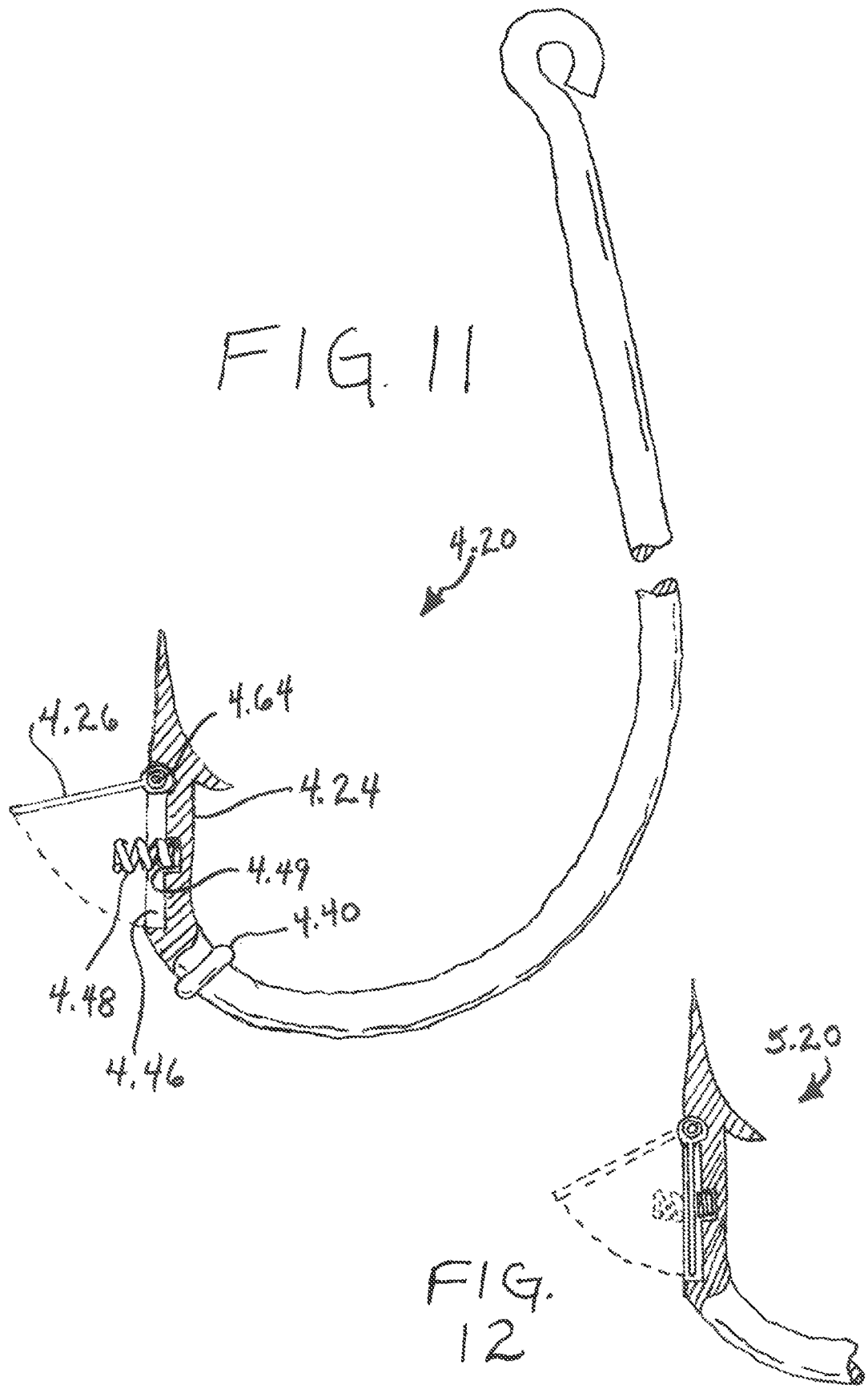

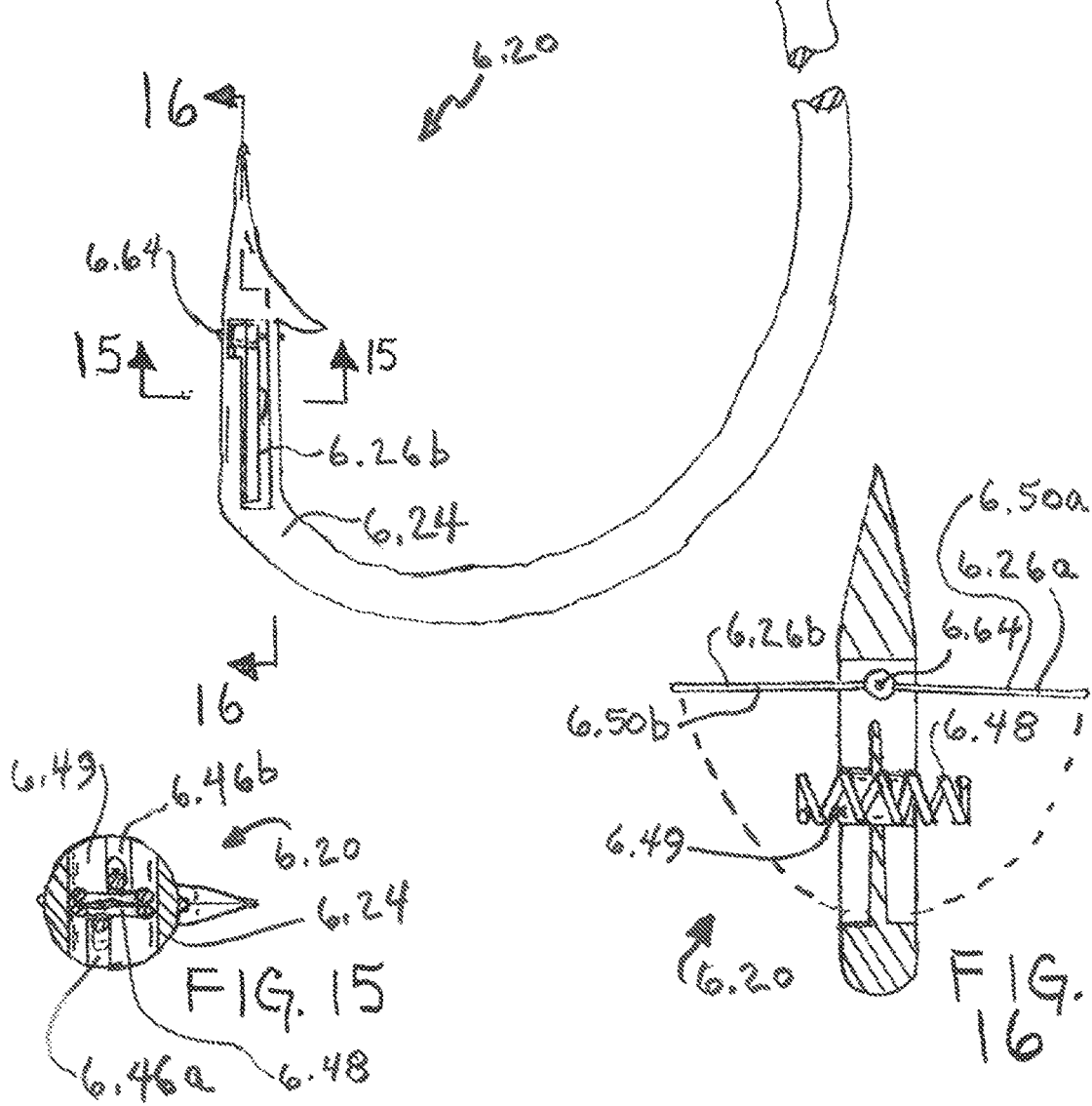

FISHING APPARATUS

CROSS REFERENCE TO RELATED APPLICATIONS

This application is a non-provisional counterpart of pending U.S. Provisional Patent Application No. 62/898,662 (filed Sep. 11, 2019) entitled "Slotted Fishing Apparatus with Hidden Mechanical Barb", fully included by reference herein, and of which this application claims priority benefit.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to hooks for catching fish and, in particular, to fishing hooks having extendable barbs.

2. Description of Related Art

The number of people who fish for sport in America—about 40 million—is greater than all of the country's golf and tennis players combined. Fishing tournaments create substantial economic opportunity for local communities and the sport fishing industry. In most mainstream fishing competitions, releasing the fish relatively unharmed after catch is a large part of the game. Competitive fishing has evolved to incorporate practices more compatible with sustaining fish stocks. These changes have alleviated much of the concern about the effects of fishing tournaments on fish stocks.

Fishing laws are meant to protect fish and make sure that there is fishing to be shared and enjoyed by everyone. Fisheries biologists study bodies of water to check on fish numbers and the health of fish populations. If there is a problem with a fish stock, regulations are created to help keep the fish population healthy. There are several types of fishing regulations, and they vary from one state to another. In some places, only a single barbless hook may be used at certain times during the year. In this context, "barbless" means that the hook either does not have a barb or that the barb is bent down, such that the barb is hidden. However, such prior art barbless fishing hooks often do not allow for a secure hooking of the fish, and often releases the fish from the hook as the fish wiggles and fights. Sports fish, such as largemouth bass, are known for jumping out of the water to try to throw or spit the hook from their mouth. It is therefore desirable to have an improved fishing hook, initially seeming to be barbless, having a configurable, movable barb that extends outwardly from the hook only after a fish has been caught on the hook.

A preliminary patentability search produced the following patents and patent publications, some of which may be relevant to the present invention: Blodgett et al., U.S. Pat. No. 2,118,147 (issued May 24, 1938); Hathaway, U.S. Pat. No. 2,215,613 (issued Sep. 24, 1940); Roos, U.S. Pat. No. 7,370,450 (issued May 13, 2008); Mendoza, U.S. Patent Appl. Publication US 2002/0124456 A1 (published Sep. 12, 2002); Brandt, U.S. Patent Appl. Publication US 2016/0143258 A1 (published May 26, 2016); and White et al., U.S. Patent Appl. Publication US 2016/0205906 A1 (published Jul. 21, 2016).

Blodgett et al., U.S. Pat. No. 2,118,147, discloses a gaff provided with a folding barb proximate the point of the gaff, and the barb can be caused to recede within the body of the gaff. However, Blodgett does not disclose or suggest a sliding retaining band that releases the barb, and does not disclose a transverse compression spring interposed between the arcuately-moving barb and the hook.

Hathaway, U.S. Pat. No. 2,215,613, discloses a fish hook having a bait clamp tang that is received into a groove in the shank of the hook. However, Hathaway does not disclose or suggest a sliding retaining band that releases the tang in the manner of the present invention, and does not disclose a transverse compression spring interposed between an arcuately-moving barb and the hook.

Roos, U.S. Pat. No. 7,370,450, discloses a fishing hook having an elongate body and barbed spring arms that are fitted to the elongate body when the body and arms are received within a plastic worm bait. However, Roos does not disclose a hook on the elongate body and does not disclose or suggest a sliding retaining band that releases the spring arms in the manner of the present invention.

Mendoza, U.S. Patent Appl. Publication US 2002/0124456 A1, discloses a fish hook with pivoted auxiliary barb. However, Mendoza does not disclose or suggest a sliding retaining band that releases the barb.

Brandt, U.S. Patent Appl. Publication US 2016/0143258 A1, discloses a shielded point motion fishing tackle having a twin set of springless, retractable fishing hooks shielded by the body of a live or artificial lure until activated by the force caused by the striking motion of a fish. However, Brandt does not disclose or suggest a sliding retaining band that releases the hooks.

White et al., U.S. Patent Appl. Publication US 2016/0205906 A1, discloses a fish gig including a retractable barb, wherein the retractable barb is operably connected to a handle configured for extending and retracting the retractable barb. However, White et al. does not disclose or suggest a sliding retaining band that releases the barb.

None of these references, either singly or in combination, discloses or suggests the present invention.

BRIEF SUMMARY OF THE INVENTION

The present invention is a fishing hook apparatus having a movable barb that is initially hidden in the body of the hook and which becomes extended outwardly from the hook only after a fish is caught on the hook. The fishing apparatus includes a shank, a hook extending from a distal portion of the shank, one or more extendable barbs, and spring means for forcibly urging the extendable barb from a first barb position proximate the hook to a second barb position in which the barb extends outwardly from the hook. The extendable barb has first and second barb ends, and is disposed for angular movement with respect to the hook from the extendable barb first end, and the second barb end moves along an arcuate path from the first barb position to the second barb position. A band may be included, circumferentially encircling the hook, slidably movable from first to second band positions. When in the first band position, each barb is held in a slot by the band. When in the second band position, each barb is urged by the spring into its second barb position. Fixed non-movable barbs may also be provided on the hook.

It is an object of the present invention to provide a fishing hook apparatus that has one or more movable barbs initially hidden within the body of the hook, such that, after a fish has been hooked, the movable barb or barbs then extend outwardly from the hook, thereby creating a "barbed" configuration of the hook, with the extension of the movable barb or barbs only happening after the hook has passed through a lip of a fish, so as to provide a more secure and better hooking of the fish than heretofore possible with a barbless hook.

It is an object of the present invention to allow a fishing user to abide by fishing regulations that restrict use of an open barb by providing a barb that is initially hidden within the hook until the hook has passed through a lip of a fish. It is a further object of the present invention to provide a fishing hook that will provide less harm to fish than the injury suffered by hooking with a regular "open barb" curved-end hook. It is a still further object of the present invention to provide a fishing hook that pass through the lip of a fish and then lock the fish onto the hook, but that will not create another injury to the fish when removing the hook and barb from the fish, unlike prior art open barbs.

It is an object of the present invention to provide a fishing hook and barb that can enter through and be removed from the fish's lip along the same path, thereby causing minimal injuries to the fish.

It is a further object of the present invention to provide a securing mechanism that securely holds the movable barb hidden within the hook until after the hook has passed through the lip of the fish.

It is a still further object of the present invention to provide a movable barb hook that can also have fixed, non-movable, barbs, such that fish can be retained more securely on hooks having fixed barbs, thereby preventing the fish from escaping from the hook once caught.

BRIEF DESCRIPTION OF THE SEVERAL VIEWS OF THE DRAWING

FIG. 1 is a partial sectional view of a first embodiment of the present invention, showing the extendable barb extended in the second barb position, and showing the band being in the second band position, with movement of the extendable barb being shown in dotted outline.

FIG. 2 is another partial sectional view of the first embodiment of the present invention, similar to FIG. 1 but showing the band holding the extendable barb in the first barb position.

FIG. 3 is a transverse sectional view of the first embodiment of the present invention taken along the line 3-3 shown in FIG. 1, showing, in solid outline, the band in the second band position and showing, in dotted outline, the band in the first band position.

FIG. 4 is a partial sectional view of a second embodiment of the present invention, showing first and second extendable barbs extended in their respective second barb positions, and showing the band being in the second band position.

FIG. 5 is a front view of the second embodiment of the present invention taken along the line 5-5 shown in FIG. 7, showing the band holding the first and second barbs in their respective first barb positions, with a portion of the band being removed to show detail of the longitudinal slots. The view from the opposite side is substantially the same.

FIG. 6 is a transverse view of the second embodiment of the present invention taken along the line 6-6 shown in FIG. 5.

FIG. 7 is another partial sectional view of the second embodiment of the present invention, taken from a different direction than FIG. 5.

FIG. 8 is a partial sectional view of a third embodiment of the present invention, showing the extendable barb extended in the second barb position, and showing the band being in the second band position.

FIG. 9 is another partial sectional view of the third embodiment of the present invention, showing the extendable barb being held by the band.

FIG. 10 is a partial sectional view of a fourth embodiment of the present invention, showing the extendable barb being held by the band.

FIG. 11 is a partial sectional view of the fourth embodiment of the present invention, showing the extendable barb extended in the second barb position and showing the band being in the second band position.

FIG. 12 is a partial sectional view of a fifth embodiment of the present invention, showing the extendable barb in the first barb position and showing in dotted outline the movement of the extendable barb into the second barb position.

FIG. 13 is a view of the eyelet pin of the fourth, fifth, and sixth embodiments of the present invention.

FIG. 14 is a side view of the sixth embodiment of the present invention.

FIG. 15 is a transverse sectional view of the sixth embodiment of the present invention, taken substantially along the line 15-15 shown in FIG. 14.

FIG. 16 longitudinal sectional view of the sixth embodiment of the present invention, taken substantially along the line 16-16 shown in FIG. 14.

DETAILED DESCRIPTION OF THE INVENTION

Figure 17:
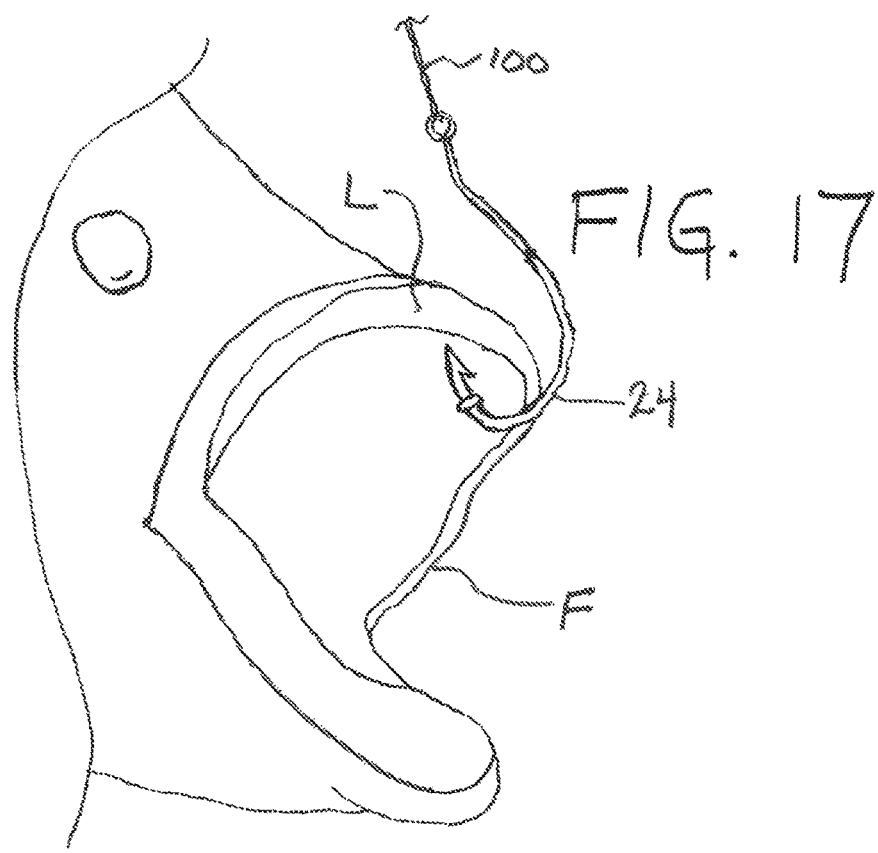
FIG. 17 shows the present invention being used to catch a fish, shown prior to penetration of a lip of the fish by the hook.

Referring to FIGS. 1-18, six embodiments of the present invention are shown. There are many similarities between the various embodiments, and only the differences between the embodiments will be discussed in detail, it being understood that similar structure for the various embodiments serves similar purpose. The reference numerals for the various parts of the first, second, third, fourth, fifth, and sixth embodiments shall be understood to have a prefix identifying the particular embodiment (e.g., "1." "2." "3.", "4.", "5.", and "6.") and a suffix identifying the particular structure (e.g., "20", etc.) for that embodiment, such that reference numerals with the same suffix are understood to be similar structure particular to each of the different embodiments (e.g., "1.20", "2.20", "3.20", "4.20", "5.20", and "6.20"). As hereinafter explained in greater detail, all embodiments comprise a fishing hook extending from a shank that is typically secured as by tying to a well-known fishing line, one or more spring-loaded pins that function as barbs, one or more longitudinal slots within the hook for receiving the barbs when the barbs are "hidden" in accordance with the present invention, and may include a securing band for holding the barb or barbs in the slot or slots when the barbs are "hidden". It shall be understood that the precise shape and size of the fishing hook is not critical to the present invention, which can be readily adapted to the sizes and shapes of desired fishing hooks. However, in the preferred embodiments of the present invention, the hook includes a bend and a sharpened end point.

Referring specifically to FIGS. 1, 2, and 3, the first embodiment 1.20 of the fishing apparatus of the present invention is shown.

Apparatus 1.20 is seen to have a shank 1.22, a hook 1.24 extending from a distal portion 1.25 of shank 1.22, and a selectively extendable barb 1.26 having a first end 1.28 and a second end 1.30. Barb 1.26 is disposed for angular movement with respect to hook 1.24 from said first end 1.28 of said barb, with second end 1.30 being movable along an arcuate path 1.32 (shown in dotted outline in FIG. 1) from a first barb position 1.34, in which second end 1.30 is proximate hook 1.24, to a second barb position 1.36 in which second end 1.30 in which second end 1.30 extends outwardly from hook 1.24. Apparatus 1.20 further includes spring means 1.38 for forcibly urging barb 1.26 from first barb position 1.34 toward second barb position 1.36. Preferably, all embodiments of the barb are made of stainless steel in order to resist corrosion and for strength and rigidity.

The first embodiment 1.20 of the apparatus further includes a band 1.40 circumferentially encircling hook 1.24 and slidably movable along hook 1.24 between a first band position 1.42, in which band 1.40 holds barb 1.26 in first barb position 1.42 and a second band position 1.44 in which band 1.40 does not hold barb 1.26 in first barb position 1.42, thereby freeing barb 1.26 to move from first barb position 1.42 to second barb position 1.44 as urged by spring means 1.38. Preferably, band 1.40 is made of rubber or silicone rubber, and hook 1.24 and shank 1.22 are preferably made of metal with a corrosion-resistant coating.

The first embodiment 1.20 of the apparatus preferably includes a longitudinal groove or slot 1.46 adapted for receipt of second end 1.30 of barb 1.26, with barb 1.26 being in first barb position 1.42 when second end 1.30 of barb 1.26 is received within slot 1.46, and with second end 1.30 of barb 1.26 not being received in slot 1.46 when barb 1.26 is in second barb position 1.44.

Spring means 1.38 of first embodiment 1.20 is seen to be a well-known torsion spring 1.52, preferably a well-known so-called "90° torsion spring" made of stainless steel in order to resist corrosion and to provide a substantial spring force to forcibly urge barb 1.26 to extend outwardly from hook 1.24. Barb 1.26 is seen to be the first leg 1.54 of torsion spring 1.52, and the second leg 1.56 of torsion spring 1.52 is received within slot 1.46 so that, when the two legs 1.54, 1.56 of torsion spring 1.52 are proximate each other, substantial spring force is stored in the spring that will move barb 1.26 when band 1.40 moves to release barb 1.26 as the hook penetrates the lip of a fish, in a manner hereinafter described.

Referring to FIGS. 4, 5, 6, and 7, the second embodiment 2.20 of the present invention can now be described in detail. Those structures that are similar to the first embodiment 1.20 need not be described again, and only the differences will be described in detail.

Whereas first embodiment 1.20 had only a single barb 1.26, second embodiment 2.20 has a first barb 2.26a and a second barb 2.26b. Each of barbs 2.26a and 2.26b respectively has a first end, respectively 2.28a, 2.28b, and a second end, respectively 2.30a, 2.30b, with barbs 2.26a and 2.26b respectively being the first and second legs 2.54 and 2.56 of a well-known so-called 180° torsion spring 2.52 that serves as spring means 2.38 of the second embodiment. First and second legs 2.54, 2.56 are respectively received in non-aligned longitudinal slots 2.46a, 2.46b that open to opposite sides of hook 2.24 as best seen in FIGS. 5 and 6. It shall be understood that the view from the back of hook 2.24 is substantially the same as the view from the front of hook 2.24 as shown in FIG. 5, such that barb 2.26a extends on one side of hook 2.24 and barb 2.26b extends on the other side of hook 2.24, as best seen in FIG. 4. As band 2.40 moves from first band position 2.42 (see FIGS. 5 and 7) to second band position 2.44 (see FIG. 4), barbs 2.26a, 2.26b are released and then extend outwardly from hook 2.24 as shown in FIG. 4.

Third embodiment 3.20 shown in FIGS. 8 and 9 only has two differences from first embodiment 1.20 shown in FIGS. 1-3, and is provided simply to show that hook 3.24 may also have a well-known fixed, non-movable barb 3.58 in a manner similar to prior art conventional hooks, and that extendable barb 3.26 can open on and extend from the outside of hook 3.24 rather than on the inside of the hook as shown in the first embodiment. Otherwise, the description of first embodiment 1.20 suffices for the third embodiment 3.20. It should be understood by this example that other variations of the present invention can be employed by those skilled in the art now that the present invention has been disclosed showing that fixed barbs can be used with movable barbs so as to provide greater hooking ability by hooks employing the movable barbs of the present invention.

Fourth embodiment 4.20 shown in FIGS. 10 and 11, rather than using a torsion spring as in embodiments 1.20, 2.20, 3.20, instead uses a compression spring 4.48 interposed between barb 4.26 and hook 4.24, with compression spring 4.48 resting in a blind bore 4.49 within longitudinal slot 4.46. In this fourth embodiment 4.20, barb 4.26 is a well-known so-called "eyelet pin" 50 shown in FIG. 13, with eyelet pin 50 having an eyelet 60 at its first end, with eyelet 60 having an axis 62 in eyelet 60 about which eyelet pin 50 moves, as upon an axial pin 4.64 that extends transversely through hook 4.24. As with the first three embodiments, fourth embodiment 4.20 has a band 4.40 that is movable upon hook 4.24 in the same manner, serving the same function as in the first three embodiments, so that description need not be repeated.

Referring to FIG. 12, fifth embodiment 5.20 is seen to be similar to fourth embodiment 4.20 except that fifth embodiment 5.20 does not have a band circumferentially encircling hook 5.24. Instead, longitudinal slot 5.26 is closely matched in size for receipt of barb 5.26 (i.e., eyelet pin 50), together with a matching selected spring constant for compression spring 5.48, so that frictional forces hold barb 5.26 within longitudinal slot 5.26 until the hook passes through the lip of a fish, at which time the disturbance forces exerted upon the hook 5.24 as the hook passes through the lip of the fish cause barb 5.26 to be released from within longitudinal slot 5.26, thereby allowing spring 5.48 to extend barb 5.26.

Referring to FIGS. 14, 15, and 16, the sixth embodiment 6.20 is seen to have many similarities to the fifth embodiment 5.20, except that sixth embodiment 6.20 has first and second selectively extendable barbs 6.26a, 6.26b similar to the dual barbs of the second embodiment, but with slightly different structure. Sixth embodiment 6.20 has first and second eyelet pins 6.50a, 6.50b, with both eyelet pins being mounted on a common axial pin 6.64 with a compression spring 6.48 being closely received within a transverse bore 6.49 through hook 6.24, and with barbs 6.26a and 6.26b being respectively received into slots 6.46a, 6.46b that open onto opposite sides of hook 6.24 when the barbs are "hidden" within the hook. As with the fifth embodiment 5.20, the size of slots 6.46a and 6.46b are carefully matched with the size of barbs 6.26a and 6.26b so that frictional forces hold the barbs within their slots until the hook passes through the lip of a fish. Of course, it shall be understood that a hook-encircling band (not shown with the sixth embodiment) may be used with the sixth embodiment in a manner taught with the earlier embodiments.

Figure 18:
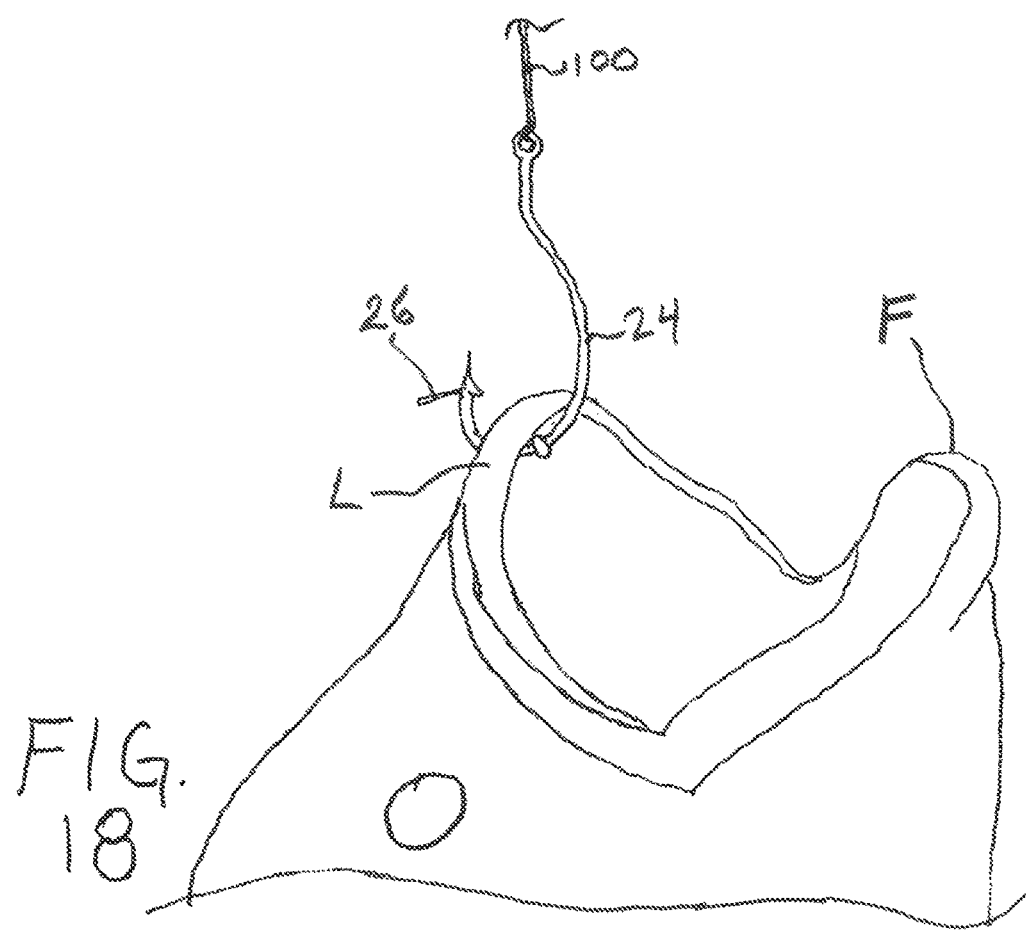
FIG. 18 shows the present invention being used to catch a fish, shown after penetration of the lip of the fish by the hook.

Referring to FIGS. 17 and 18, the use of the present invention can now be explained. Because the use of all embodiments is similar, the hook is referred to generically in FIGS. 17 and 18 as 24, the band is referred to generically as 40, and the barb is referred to generically as 26. A well-known fishing line 100 is attached to the hook in the usual well-known manner. As shown in FIG. 17, before the hook 24 penetrates the lip L of the fish F, the barb is "hidden" within the hook 24 in a manner hereinbefore described in detail for each of the embodiments. As shown in FIG. 18, after the hook passes through the lip L of the fish F, band 40 is slidably moved along hood 24 as the hook 24 passes through the lip L of the fish F, as hereinbefore described, thereby releasing the barb 26, entrapping the fish F on the hook 24.

INDUSTRIAL APPLICABILITY

The fishing hook of the present invention is used to catch fish and to retain the fish on the hook. As compared to the prior art, the fishing hook provides a barb that is hidden within the shank of the hook and then extends from the shank when released by a sliding retaining band.

Although the present invention has been described and illustrated with respect to a preferred embodiment and a preferred use therefor, it is not to be so limited since modifications and changes can be made therein which are within the full intended scope of the invention.

I claim:

1. A fishing apparatus, said apparatus comprising:
   (a) a shank;
   (b) a hook extending from a distal portion of said shank;
   (c) a selectively extendable barb having a first end and a second end, said extendable barb being disposed for angular movement with respect to said hook from said first end of said extendable barb, said second end of said extendable barb being movable along an arcuate path from a first barb position in which said second end of said extendable barb is proximate to said hook, to a second barb position in which said second end of said extendable barb extends outwardly from said hook; and
   (d) spring means for forcibly urging said extendable barb from said first barb position toward said second barb position;
   said hook having a longitudinal slot therein adapted for receipt of said second end of said extendable barb, said extendable barb being in said first barb position when said second end of said extendable barb is received in said slot, and said second end of said extendable barb not being received in said slot when said extendable barb is in said second barb position; said distal portion of said shank having a transversely completely solid portion, intermediate said extendable barb and a proximal portion of said shank, thereacross said shank's diameter.

2. The fishing apparatus as recited in claim 1, in which said spring means comprises a compression spring interposed between said extendable barb and said hook.

3. The fishing apparatus as recited in claim 2, in which said extendable barb comprises an eyelet pin having an eyelet at said first end of said extendable barb, said eyelet having an axis about which said extendable barb moves.

4. The fishing apparatus as recited in claim 3, in which said apparatus further includes a band circumferentially encircling said hook and slidably movable thereon between a first band position, in which said band holds said extendable barb in said first barb position, and a second band position, in which said band does not hold said extendable barb in said first barb position, thereby freeing said extendable barb to move from said first barb position to said second barb position as urged by said spring means.

5. The fishing apparatus as recited in claim 4, in which said band is made of rubber.

6. The fishing apparatus as recited in claim 1, in which said spring means comprises a torsion spring, and in which said extendable barb is a first leg of said torsion spring, said torsion spring having a second leg received in said slot.

7. The fishing apparatus as recited in claim 6, in which said apparatus further includes a band circumferentially encircling said hook and slidably movable thereon between a first band position, in which said band holds said extendable barb in said first barb position, and a second band position, in which said band does not hold said extendable barb in said first barb position, thereby freeing said extendable barb to move from said first barb position to said second barb position as urged by said spring means.

8. The fishing apparatus as recited in claim 7, in which said band is made of rubber.

* * * * *